Dec. 17, 1935.   F. B. KEALL ET AL   2,024,293
DRIVING AND STOPPING MECHANISM
Filed March 6, 1935
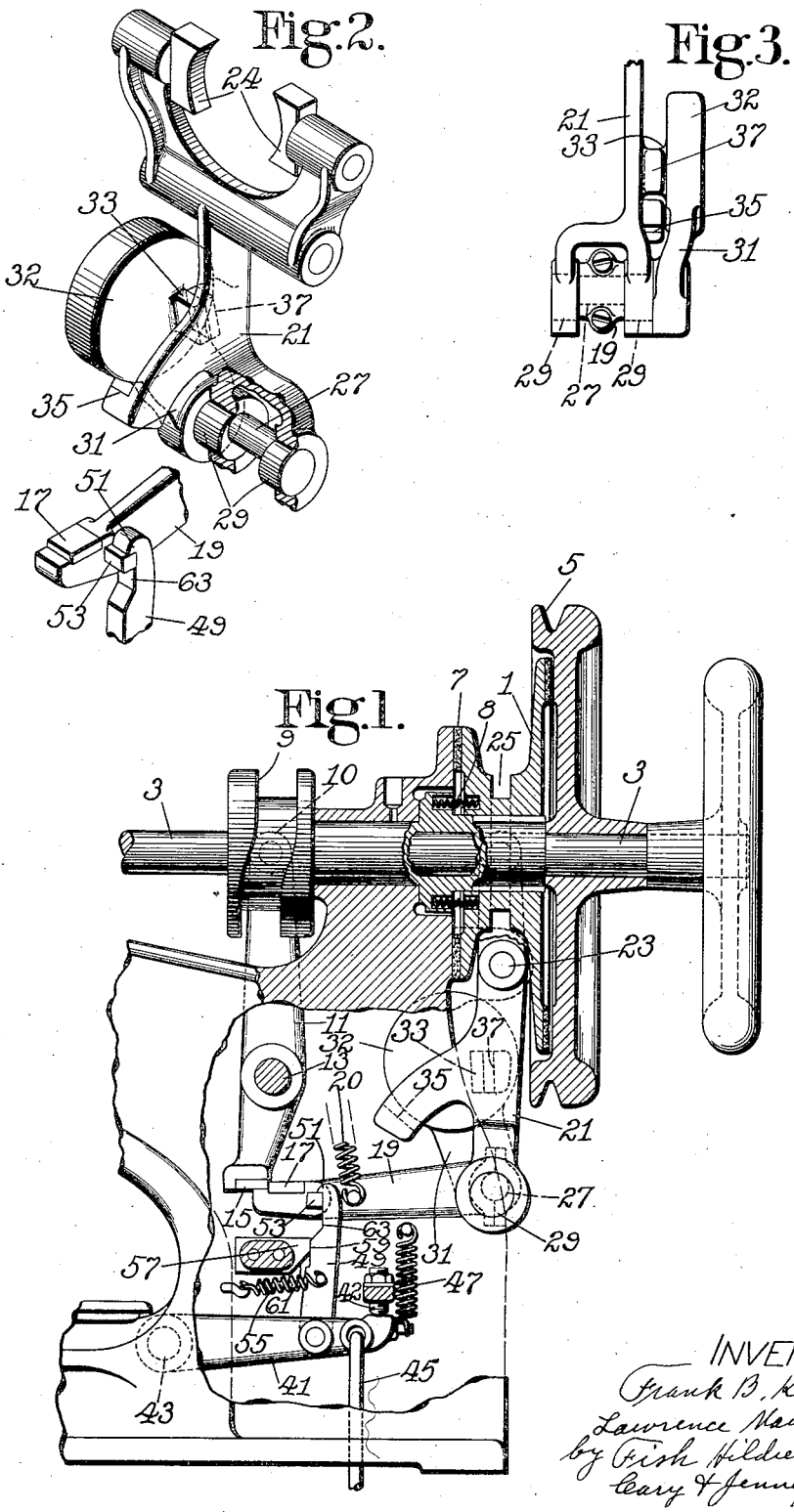
INVENTOR
Frank B. Keall
Lawrence Mawbey
by Fish Hildreth
Cary & Jenney Attys.

Patented Dec. 17, 1935

2,024,293

UNITED STATES PATENT OFFICE 2,024,293

DRIVING AND STOPPING MECHANISM

Frank Bycroft Keall and Lawrence Mawbey, Leicester, England, assignors to United Shoe Machinery Corporation, Paterson, N. J., a corporation of New Jersey Application March 6, 1935, Serial No. 9,574
In Great Britain March 20, 1934

20 Claims. (Cl. 192—144)

This invention relates to starting and stopping mechanisms for shoe or other machinery and is particularly, but by no means exclusively, concerned with clutch controlling mechanisms for machines which are driven at a comparatively high speed and which it is desired to stop after either a single cycle or a plurality of cycles of the machine always at substantially the same point in the cycle.

A machine of this kind is, for example, described in the specification of British Letters Patent No. 15,555 of 1908 which disclose a machine for perforating workpieces and by means of which it may be desired to form a row of equally spaced perforations in the workpiece, or it may be desired to form a single perforation in a workpiece.

Clutch controlling mechanisms with which the present invention is particularly concerned include a member which, during the stopping of the machine, is forced into engagement with a stationary braking surface on the machine frame and, when the machine is caused to operate, the said member is moved away from the braking surface and into engagement with a continuously driven pulley or the like of the machine. The said member is forced into engagement with the braking surface by cam operated mechanism which forces the member with a comparatively heavy pressure against the braking surface. The cam operated mechanism includes a trip device which is operated by a treadle or other means actuated by the operator. If the member is forced hard against the braking surface, the trip device becomes correspondingly hard to operate and calls for undesired effort on the part of the operator to start the machine. If the machine is driven at a comparatively high speed, for instance, about 800 R. P. M. it may be difficult for the operator to depress and release the treadle quickly enough to ensure that the machine will stop after a single cycle since a machine having light moving parts and driven at a high speed is almost immediately being driven at the high speed when the clutch is closed and may complete or partly complete its cycle before the operator has had time to release the treadle to allow the trip device to operate to stop the machine after a single cycle.

As hereinbefore stated it may be desirable to allow the machine to complete a number of cycles before it is stopped and the clutch controlling mechanism requires in this case to be such that the operator can with certainty control the clutch so that the machine completes either a single cycle and then stops or the machine operates for a plurality of cycles before it is stopped.

One of the several objects of the present invention is to provide a clutch controlling mechanism capable of stopping a machine, which is driven at a comparatively high speed, at a desired point in the cycle of the machine while providing for easy operation of tripping means of the controlling mechanism when the tripping means is actuated to cause the machine to operate.

Another object of the present invention is to provide tripping means for a clutch controlling mechanism of a machine whereby the machine may be caused to be driven through a single cycle only or may be caused to be driven through a number of cycles as determined by the operator by manipulation of a single tripping member.

One feature of the invention resides in a clutch controlling mechanism having means to forcibly press together a moving member and a stationary brake member to stop the machine and inertia actuated means for automatically relieving the pressure between the moving member and the stationary member on the stopping of the machine.

Another feature of the present invention resides in a clutch controlling mechanism having means whereby actuation of a single member causes the machine to complete a single cycle only or a plurality of cycles as determined by the operator.

The above and other objects and the several features of the invention will become apparent to those skilled in the art from a consideration of the following description and drawing, given by way of example, of a preferred form of clutch controlling mechanism according to the invention.

In the drawing:

Fig. 1 is an elevation of a portion of the frame of a machine, partly broken away, in which a preferred form of the clutch controlling mechanism of the present invention is mounted for driving the machine;

Fig. 2 is a perspective view of certain parts of the said clutch controlling mechanism shown in Fig. 1; and Fig. 3 is an end elevation of certain parts shown in Figs. 1 and 2.

The said preferred form of mechanism comprises a clutch member 1 which is mounted, by means of a key, to turn with and slide on the horizontal main shaft 3 of the machine. This shaft extends from right to left of the machine, when viewing the machine from the operator's position. The clutch member 1 is moved in one direction along the shaft into engagement with a pulley 5 that is freely rotatable on the shaft and the member is moved in the opposite direction along the shaft into engagement with a leather braking disc 7 secured on the machine frame. The movement of the clutch member in the first-mentioned direction is caused by springs 8 and the movement in the opposite direction is caused by a cam 9 fast on the main shaft 3, the cam being connected to the clutch member 1 by means of a lever arrangement. The said lever arrangement comprises a substantially vertical cam lever 11, pivoted about midway of its length on a horizontal shaft 13 extending forwardly and rearwardly of the machine, the cam lever carrying, at its upper end, a cam roll 10 which engages the cam 9 on the main shaft. The cam lever 11, at its lower end, has secured to it a block 15 which is engaged by a block 17 secured to a substantially horizontal latch or trip arm 19 which extends to the right. The other end of the trip arm is pivotally connected, as hereinafter described, to the lower end of a substantially vertical clutch lever 21 pivoted about midway of its length on a horizontal stud 23 secured in the machine frame. The upper end of the clutch lever 21 is forked and each arm of the fork has pivoted on it a block 24 which enters a groove 25 in the clutch member 1. As the machine comes to rest the cam 9, acting through the cam lever 11, blocks 15, 17, trip arm 19 and clutch lever 21 causes the clutch member 1 to be moved along the main shaft 3 out of engagement with the pulley 5 and into engagement with the braking disc 7 on the machine frame. When the trip arm 19 is swung downwardly by means of a treadle, as hereinafter described, the block 17 on the arm is moved below the block 15 on the cam lever and the clutch member 1 is then moved along the main shaft by its springs 8 into engagement with the pulley 5 on the main shaft. A spring 20 holds the end of the trip arm 19 up against the block 15 on the cam lever 11 when the mechanism is in stopped position.

The inertia actuated means for relieving the brake comprises a novel pivotal connection between the trip arm 19 and the clutch lever 21, refered to above, which will now be described. The trip arm 19 is pivotally mounted on an eccentric portion 27 of a spindle 29 which is rotatably mounted in the lower end of the clutch lever 21, which end is forked with the end of the trip arm 19 positioned in the form (see Fig. 2). The said spindle 29 projects from a weighted arm 31 which extends from the spindle upwardly and to the left viewing the machine from the front. The weighted arm carries an integral weight 32 from which projects a lug 33 which is positioned between a pair of stop faces 35, 37 formed on the clutch lever 21. The stop faces are preferably covered with leather and are spaced apart a distance which allows the weighted arm 31 to swing freely through an angle of substantially thirty-five degrees. The eccentricity of the eccentric portion 27 of the aforesaid spindle 29 is about one-eighth of an inch and when the weighted arm 31, from which the spindle projects, is swung so that the lug 33 on the weight moves from one stop face to the other, the axis of the eccentric portion 27 swings about the axis of the spindle 29 from one side to the other of a vertical plane through the axis of the spindle and, in so swinging, moves the trip arm 19 lengthwise about one-sixteenth of an inch relatively to the clutch lever 21.

The above mechanism operates in the following manner. When the machine is stopped the weighted arm 31 has been, as will hereinafter appear, swung upwardly and the trip arm 19 has been moved to the right relatively to the clutch lever. When the trip arm 19 is moved downwardly to release the block 17 on the arm from the block 15 in the cam lever 11 to allow the clutch member 1 to be moved by its springs into engagement with the driving pulley 5 and the machine to be driven, the weighted arm 31 falls by its own weight and turns the spindle 29 until the fall is arrested by the engagement of the lug 33 on the weight with the lower stop face 35 on the clutch lever 21. This turning of the spindle 29 moves the eccentric 27 and this moves the trip arm a little distance to the left relatively to the clutch lever 21. While the machine is operating, the trip arm 19 is held down by the operator and the block 15 on the cam lever swings to and fro idly above the block 17. When the trip arm 19 is released by the operator, and its left hand end is raised by its spring 20, the end of the block 17 on the arm is engaged by the end of the block 15 on the cam lever 11 as the block 15 swings towards the right and this moves the clutch member out of engagement with the pulley 5 and into engagement with the braking disc 7 on the machine frame to stop the machine. During the movement of the trip arm 19 towards the right to stop the machine, the inertia of the weighted arm 31 tends to prevent turning movement of the eccentric spindle 29 and consequent movement to the right of the trip arm relatively to the clutch lever. The clutch member 1 is, therefore, owing to the inertia in the weighted arm 31, pressed hard and with a maximum effort against the braking disc to stop the machine, because of the longer effective length of the connection between the levers 11 and 21.

After the clutch member has been pressed hard against the braking disc and brought the machine to rest, the clutch springs 8 and the springiness in the leather braking disc 7 and in the levers 21, 11 re-act and move the clutch member 1 away from the braking disc and in doing so, cause the inertia of the weighted arm to be overcome. Through the eccentric spindle, the weighted arm 31 is swung upwardly until the lug 33 on the weight engages the upper stop face 37. This movement of the weighted arm is of such extent that the effective length of the connection between the levers 11 and 21 is reduced so that the pressure of the clutch member against the braking disc is partly, but not entirely, relieved. The relieving of this pressure also relieves the force applied between the block 17 on the trip arm 19 and the block 15 on the cam lever 11 and causes the tripping of the clutch by the withdrawal of the block 17 from engagement with the block 15 to be very easy of accomplishment.

In the said preferred form of the invention a mechanism is provided whereby the machine to be controlled may either be caused to complete a single cycle and then stop, or whereby it may be caused to operate continuously and then be stopped when desired.

In this mechanism a treadle actuated arm 41 is pivoted at 43 to the machine frame and is connected by a rod 45 to a treadle lever. When the treadle is released, a spring 47 moves the arm 41 upwardly against an adjustable stop screw 42 carried by the machine frame. The arm 41 has pivoted to it a latch 49 which has a hook 51 formed on it at its upper end. The hook 51 engages a stud 53 secured in the arm 19 and a spring 55 holds the latch in engagement with the stud 53.

A block 57 is adjustably secured on the machine frame. This block has a vertical face 59 arranged to be engaged by the latch 49 and it is cut away at its lower right hand corner to form an inclined face shown at 61. The latch 49 is reduced in width at its upper end, as shown at 63. The inclined face 61 of the block 57 and the reduced part of the latch 49 allow the latch 49 to be swung to the left by its spring 55 when the treadle is fully depressed.

If the treadle is only depressed sufficiently far to just move the block 17 below the block 15, the arm 19 will move to the left, permitting the springs 8 to move the clutch member 1 into engagement with the pulley 5 to start the machine and also permitting the weighted arm 31 to fall. However, as the arm 19 moves to the left, the stud 53 thereon becomes disengaged from the hook 51 of the latch 49 because the latch immediately comes in contact with the vertical face 59 on the block 57 and cannot move with the stud 53 and arm 19. The cam lever 11 now starts to move the block 15 thereon to the left while the arm 19 and block 17 are raised by the spring 20 so that, thereafter, as the block 15 moves to the right it comes in contact with the block 17 and the arm 19 is moved to the right, moving the clutch member 1 out of engagement with the pulley 5 and into engagement with the brake disc 7 to stop the machine after a single revolution.

If the treadle is fully and quickly depressed, the inclined face 61 of the block 57 and the reduced portion 63 of the latch 49 allow the hook 51 on the latch 49 to be held by the spring 55 in contact with the stud 53 so that they remain in engagement as the arm 19 moves to the left and as the weighted arm 31 falls moving the arm 19 still further in starting the machine. Thereafter as the block 15 moves back and forth, it clears the block 17 so that the machine continues to operate until the treadle is released, when the vertical face 59 causes the hook 51 to release the stud 53, permitting the arm 19 to rise so as to stop the machine, as above described.

The operator can, therefore, by partly depressing the treadle, cause the machine, although operating at comparatively high speed, to definitely make a single operative cycle or can, by fully depressing the treadle, cause the machine to make a plurality of operative cycles.

Having thus explained the nature and object of the invention, and having specifically described a machine embodying the several features thereof in their preferred form, what is claimed is:—

1. A driving and stopping mechanism having, in combination, a driven shaft, a driving clutch for rotating the shaft, a brake for bringing the shaft to rest, and inertia-controlled clutch and brake actuating mechanism arranged when set into operation to apply a maximum pressure to the brake and thereafter, as the inertia of said mechanism is overcome, to relieve the brake pressure.

2. A driving and stopping mechanism having, in combination, a driven shaft, a driving clutch for rotating the shaft, a brake for bringing the shaft to rest, a cam on the shaft for actuating the clutch and brake to bring the shaft to rest at a predetermined point, a member actuated by the shaft, a treadle rod, connections cooperating with the member and treadle rod to cause the member to be effective in actuating the brake with a maximum pressure, and a weight arranged to be moved by reaction force of the brake pressure on said connections when the shaft comes to rest.

3. A driving and stopping mechanism having, in combination, a driven shaft, a driving clutch, a brake for bringing the shaft to rest, a member actuated by the shaft, a treadle rod for controlling the clutch and brake, brake operating connections cooperating with the member and treadle rod to apply the brake with a maximum pressure when the clutch is disengaged, and a weight movable by a reaction of brake pressure on the connections to relieve the force of said reaction when the shaft comes to rest.

4. A driving and stopping mechanism having, in combination, a driven shaft, a driving clutch, a brake for bringing the shaft to rest, a member actuated by the shaft, a treadle rod for controlling the clutch and brake, connections under the control of the treadle rod cooperating with the member to apply the brake with a maximum pressure when the clutch is disengaged and a weighted swinging arm forming a part of said connections to relieve the force of brake pressure reaction on said connections when the shaft is stopped.

5. A driving and stopping mechanism having, in combination, a driven shaft, a driving clutch, a brake for bringing the shaft to rest, a member actuated by the shaft, a treadle rod for controlling the clutch and brake, connections under the control of the treadle rod cooperating with the member to apply the brake with a maximum pressure when the clutch is disengaged, and a weight acting on said connections to relieve the force of brake pressure reaction on said connections when the shaft is stopped.

6. A driving and stopping mechanism having, in combination, a driven shaft, a driving member, a brake member, a clutch member mounted on the shaft for movement between the driving member and the brake member, a spring to force the clutch member towards the driving member, a cam on the shaft, a treadle rod, connections under the control of the treadle rod between the cam and the clutch member to disengage the clutch member from the driving member and to engage it with the brake member with a maximum pressure, and a weighted swinging arm forming a part of said connections to relieve the force of brake pressure reaction on said connections when the inertia of said arm permits it to swing.

7. A driving and stopping mechanism having, in combination, a driven shaft, a driving member, a brake member, a clutch member arranged on the shaft to engage the driving member, clutch member controlling means, a member actuated by the shaft, a treadle rod, connections under control of the treadle rod between the clutch controlling means and the shaft actuated member for disengaging the clutch member from the driving member and for engaging it with the brake member, and means forming a part of said connections to relieve the force of brake pressure reaction on said connections when the main shaft comes to rest.

8. A driving and stopping mechanism having, in combination, a driven shaft, a driving member, a brake member, a clutch member arranged on the shaft to engage the driving member, clutch member controlling means, a member actuated by the shaft, a treadle rod, connections under control of the treadle rod between the clutch controlling means and the shaft actuated member for disengaging the clutch member from the driving member and for engaging it with the brake member, and means forming a part of said connections to cause the effective length of said connections to change after the clutch member is pressed against the brake member.

9. A driving and stopping mechanism having, in combination, a driven shaft, a driving member, a brake member, a clutch member arranged on the shaft to engage the driving member, clutch member controlling means, a member actuated by the shaft, a treadle rod, compression actuated connections under control of the treadle rod between the clutch controlling means and the shaft actuated member for disengaging the clutch member from the driving member and for pressing it against the brake member, and means forming a part of said connections to shorten the effective length of said connections after the clutch member is pressed against the brake member.

10. A driving and stopping mechanism having, in combination, a driven shaft, a driving member, a brake member, a clutch member arranged on the shaft to engage the driving member, a clutch controlling lever, a cam on the shaft, a cam actuated lever, a treadle rod, a connection under the control of the treadle rod between said levers for disengaging the clutch member from the driving member and engaging it with the brake member, a weighted arm, and a spindle rotatable in the clutch controlling lever as the weighted arm swings and provided with an eccentric portion forming a mounting for said connection to permit the effective length of the connection with said arm to change when the inertia of the weighted arm is overcome by reaction of braking force imparted through said connection.

11. A driving and stopping mechanism having, in combination, a driven shaft, a driving member, a brake member, a clutch member arranged on the shaft to engage the driving member, a clutch controlling lever, a cam on the shaft, a cam actuated lever, a treadle rod, a latch on the clutch controlling lever for engaging the cam lever under the control of the treadle rod to disengage the clutch member from the driving member and engage it with the brake member, a weighted swinging arm, a spindle rotatable in the clutch controlling lever and provided with an eccentric portion forming a mounting for said latch to permit the positions of the clutch controlling lever and the latch to change when the inertia of the weighted arm is overcome by reaction of braking force imparted through said latch.

12. A driving and stopping mechanism having, in combination, a driven shaft, a driving member, a clutch mounted on the shaft for movement towards and from the driving member, a brake for bringing the shaft to rest, a member actuated by the shaft, a treadle rod for causing the clutch to be moved against the driving member, connections under the control of the treadle rod between the member and brake for applying the brake with a maximum pressure when the clutch is disengaged from the driving member, a weighted swinging arm forming a part of said connections to relieve the force of brake pressure reaction on said connections when the shaft is stopped, and means for limiting the swinging movement of said lever to prevent the brake pressure from being entirely relieved.

13. A driving and stopping mechanism having, in combination, a driven shaft, a driving member, a clutch mounted on the shaft for movement towards and from the driving member, a brake for bringing the shaft to rest, a member actuated by the shaft, a treadle rod for causing the clutch to be moved against the driving member, connections under the control of the treadle rod cooperating with the member to apply the brake with a maximum pressure when the clutch is disengaged from the driving member, and a weight arranged to be raised by reaction force of the brake pressure on said connections and to be lowered when the treadle rod is actuated to release the brake.

14. A driving and stopping mechanism having, in combination, a driven shaft, a clutch, a brake, a cam on the driven shaft, mechanism actuated by the cam to open the clutch and apply the brake to stop the shaft, comprising a member actuated by the shaft and a trip arm movable into engagement with the shaft actuated member to stop the shaft, means including a treadle rod for moving the trip arm into and out of engagement with the shaft actuated member, an eccentric mounting for the trip arm, and a weight arranged to resist rotation of said mounting as the brake is applied and to permit rotation of said mounting to relieve the braking pressure as the inertia of the weight is overcome by the reaction force of the braking pressure on said mounting.

15. A driving and stopping mechanism having, in combination, a driven shaft, a clutch, a brake, a cam on the driven shaft, mechanism actuated by the cam to open the clutch and apply the brake to stop the shaft, comprising a member actuated by the shaft and a trip arm movable into engagement with the shaft actuated member to stop the shaft, means including a treadle rod for moving the trip arm into and out of engagement with the shaft actuated member, a spindle provided with an eccentric portion forming a mounting for the trip arm, and a weight arranged to resist rotation of said spindle as the brake is applied and to permit rotation of said spindle to relieve the braking pressure as the inertia of the weight is overcome by the reaction force of the braking pressure on said spindle.

16. A driving and stopping mechanism having, in combination, a driven shaft, a clutch, a brake, a cam on the driven shaft, mechanism actuated by the cam to open the clutch and apply the brake to stop the shaft, a treadle rod and connections for rendering said mechanism inoperative, means for releasing the brake and closing the clutch when said mechanism is rendered inoperative, yielding means for moving said mechanism to operative position, means for releasably connecting the treadle rod and said mechanism to move said mechanism to inoperative position when the rod is actuated, and means acting in one position of the treadle rod to disconnect the said mechanism from the treadle rod before a single rotation of the main shaft, and in another position of the treadle rod to permit said mechanism to be held inoperative continuously.

17. A driving and stopping mechanism having, in combination, a driven shaft, a clutch, a brake, a cam on the driven shaft, mechanism actuated by the cam to open the clutch and apply the brake to stop the shaft, a treadle rod and connections for rendering said mechanism inoperative, means for releasing the brake and closing the clutch when said mechanism is rendered inoperative, connections in said mechanism yieldingly held in operative position, a disconnectable hook between the treadle rod and the connections to move said connections to inoperative position, and means engaging the hook in one position of the treadle rod to disconnect the hook during the first revolution of the shaft and in another position of the treadle rod permitting the connections to be held inoperative continuously.

18. A driving and stopping mechanism having, in combination, a driven shaft, a clutch, a brake, a cam on the driven shaft, mechanism actuated by the cam to open the clutch and apply the brake to stop the shaft, a treadle rod, and connections for rendering said mechanism inoperative, means for releasing the brake and closing the clutch when said mechanism is rendered inoperative, yielding means for moving said mechanism to operative position, a hook for connecting the treadle rod and said mechanism to move said mechanism to inoperative position when the rod is actuated, a block acting in one position of the treadle rod to disconnect the hook during the first revolution of the shaft, and means for preventing the hook from being disconnected when the treadle rod is quickly moved to another position.

19. A driving and stopping mechanism having, in combination, a driven shaft, a clutch, a brake, a cam on the driven shaft, mechanism actuated by the cam to open the clutch and apply the brake to stop the shaft, a treadle rod and connections for rendering said mechanism inoperative, means for releasing the brake and closing the clutch when said mechanism is rendered inoperative, and means for disconnecting the treadle rod and said mechanism during the first revolution of the shaft upon a partial movement of the treadle rod and for maintaining the connection between the treadle rod and said mechanism upon a full movement of the rod.

20. A driving and stopping mechanism having, in combination, a driven shaft, a clutch, a brake, a cam on the driven shaft, mechanism actuated by the cam to open the clutch and apply the brake to stop the shaft comprising a member actuated by the shaft and a trip arm movable into engagement with the shaft actuated member to stop the shaft, a treadle rod, a hook carried by the treadle rod for actuating the trip arm, and means for disconnecting the hook from the trip arm during the first revolution of the shaft upon a partial movement of the treadle rod and for maintaining the hook in engagement with the trip arm upon a full movement of the rod.

FRANK BYCROFT KEALL.
LAWRENCE MAWBEY.